United States Patent

West

Patent Number: 4,777,421
Date of Patent: * Oct. 11, 1988

[54] PHASE CONVERTER FOR MOTOR

[76] Inventor: Reed West, 3026 Quail Rd., Escondido, Calif. 92026

[*] Notice: The portion of the term of this patent subsequent to Apr. 2, 2004 has been disclaimed.

[21] Appl. No.: 60,922

[22] Filed: Jun. 12, 1987

[51] Int. Cl.$^4$ .............................................. H20P 1/26
[52] U.S. Cl. .................................... 318/768; 318/769; 363/150; 363/148
[58] Field of Search ................ 318/768, 767; 363/150, 363/148, 149

[56] References Cited

U.S. PATENT DOCUMENTS

| | | | |
|---|---|---|---|
| 2,593,987 | 4/1952 | Courtney et al. | 318/768 |
| 3,201,673 | 8/1965 | Williford et al. | 318/768 |
| 3,202,896 | 8/1965 | Lewus | 318/768 |
| 3,673,480 | 6/1972 | Johnstone | 318/768 |
| 4,656,575 | 4/1987 | West | 363/150 |

Primary Examiner—William M. Shoop, Jr.
Assistant Examiner—Brian Young
Attorney, Agent, or Firm—John J. Murphey

[57] ABSTRACT

A single-phase to three-phase converter for starting and running a single, three-phase, load carrying induction motor having first, second and third Y-wound stator windings from a single phase power supply comprising a connector for connecting the input conductors to the converter to a source of single-phase alternating current, a connector for connecting the output conductors from the converter to the three-phase induction motor and adapted to connect one single-phase input conductor to the first stator winding and the other single-phase input conductor to the second stator winding, a bank of run capacitors connected between the first powered stator winding and the third unpowered stator winding to develop a voltage in the third winding at a phase angle different from the phase angles in the first and second powered windings, a potential-type relay comprising a set of normally closed contacts and a winding to open them, the windings connected between the second and third stator winding, a slave relay comprising a set of normally open contacts and a winding to close them, the slave relay winding connected between the first stator winding and the potential relay winding through a set of normally closed potential relay contacts and a bank of start capacitors connected between the third unpowered stator winding and one of the slave relay open contacts adapted to produce immediate capacitor-phase shifted starting power to the third stator winding.

7 Claims, 1 Drawing Sheet

U.S. Patent  Oct. 11, 1988  4,777,421
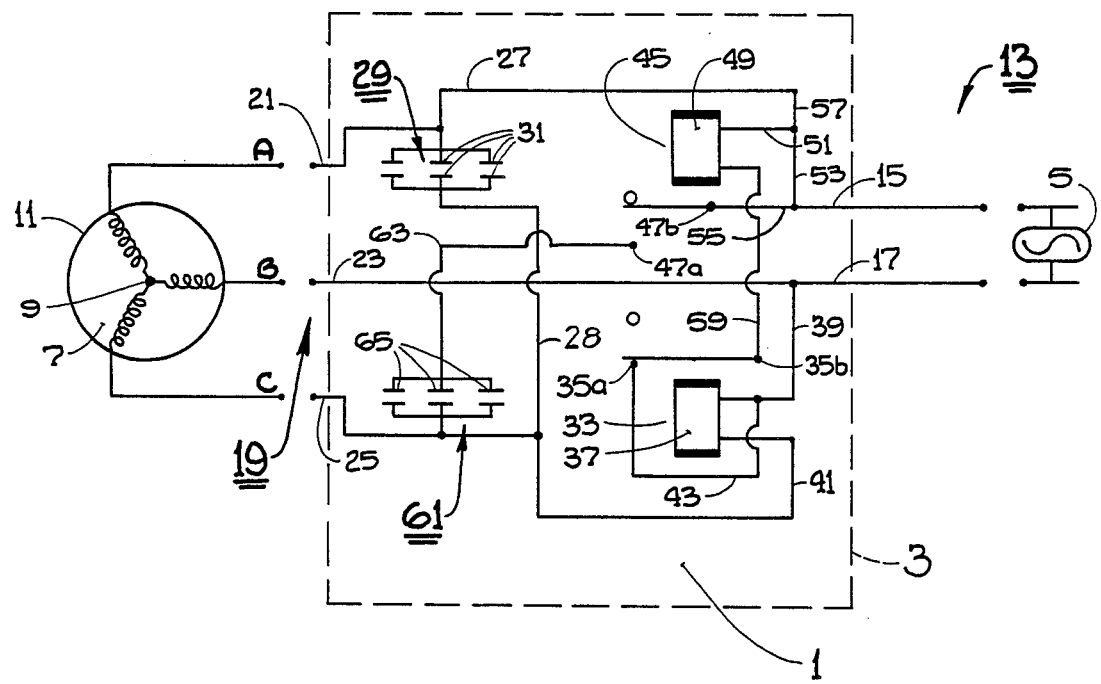

PHASE CONVERTER FOR MOTOR

BACKGROUND OF THE INVENTION

1. Field of the Invention

This invention pertains to the field of electric power delivery systems. More particularly, this invention concerns polyfield driven devices and, more specifically, to devices to convert single-phase alternating current to three-phase alternating current.

Description of the Prior Art

Three-phase electric motors are generally considered creatures of heavy industry necessitating three separate electrical input phases in the form of heavy power lines. Single-phase electric motors are generally found in light industry and most commercial activity, for example, dry cleaning shops and auto repair stations and the like, where single-phase electric power may be brought in by lighter gauge power lines. While historically three-phase electric motors are more powerful, on a pound-for-pound basis, than their single-phase counterparts, modern technology has made them even more desirable with the advent of lighter gauge construction and higher torque output. A problem remains, however, in that the cost of installing three-phase electrical power lines into a business severed by existing single-phase is so costly that it far outweighs the benefits of three-phase motors.

In the three-phase electric motor, there are three separate field or stator windings equally spaced about the centerline of the rotor and connected at the center to form the Y-wind. In three-phase power, the phase angles between the alternating current in each winding is equally spaced apart from that of the neighbor winding by 120°; this provides maximum torque to the motor to start and provides balanced power during running. Should single-phase power be connected to two of the windings of a three-phase motor, there would be no power developed in the third winding and the motor would either not run at all or run so slowly that heat build-up would eventually burn the windings. However, three-phase motors are very efficient and deliver more power per watt than single-phase motors so that, whenever it is economically feasible to create a third phase, the use of three-phase motors becomes exceedingly desirable.

The prior art has recognized that single-phase power can be split into three, phase-differentiated, phase-angled currents to effectively power three-phase motors. This operation makes three-phase motors useful in light industrial applications. Device that develop three-phase alternating current from a single-phase source are of two general types: The static phase converter, a device comprising transformers and other related electronic components, see U.S. Pat. No. 2,832,925, and the rotary phase converted, a device comprising an induction motor powered by single-phase and producing three-phase current, see U.S. Pat. Nos. 2,593,987; 2,922,942; 3,122,693; 3,271,646; 3,387,202; 3,566,226; 3,670,238; 3,673,480; 3,809,980; 4,079,446; 4,249,237; 4,484,125; 4,513,237 and my recently issued patent 4,656,575. This invention concerns the former type.

My recently issued patent concerns a single phase to three phase dynamoelectric converter for generating three-phase current from a single-phase input comprising a three-phase electric motor generator having first, second and third Y-wound stator windings, a bank of run capacitors connected between the first powered stator winding and the third unpowered stator winding, a normally closed potential-type relay with its winding connected between the second and third stator windings, a normally-open slave relay with its winding connected between the first stator winding and the potential relay winding through the set of normally closed potential relay contacts, and a bank of starter capacitors connected between the third stator winding and one of the slave relay open contacts adapted to provide phase shifted starting power to the third stator winding when the single phase energy is applied and disconnect from the third stator winding to allow the converter to run and produce balanced three-phase power that can be drawn from all three stator windings for use to start and drive externally located three-phase motors.

It was not considered that this invention could be used to drive only one three-phase motor under load but that it could only drive a motor that could, itself, provide balanced three-phase power to start and drive the other motors in parallel therewith. It has been surprisingly discovered, however, that this circuitry can, by itself, start and drive a motor under load without the need for the motor-generator in the circuit. The device of this invention, however, can drive only one motor at a time when used in this fashion because the load on the motor does not permit it to act as a generator to produce balanced three-phase power for other, three-phase motors as is the situation with my recently issued patented invention.

The prior art is replete with devices that allow a three-phase motor to be started and run from a single phase source of alternating current, however, they have, for one reason or another, not been generally accepted because of shortcomings inherent in their design.

For instance, in Johnstone (U.S. Pat. No. 3,673,480) there is disclosed a circuit having in combination a first relay means, a first contact means controlled thereby and an induction motor starting capacitor; a coil and a neon bulb in parallel with the induction motor starting capacitor for reducing a charge stored thereon; and, means for supplying inputs to the three-phase induction motor consisting of first and second connections to the single phase alternating current and third input means connected between the first relay coil and the first contact means. Such a circuit utilizes continual charging and discharging of the starting capacitors and requires constant attention be paid to the neon bulb to observe the draining of the capacitors. In addition, the unpowered winding is connected between the relay and the starting capacitor. This condition is considered the root of much chattering in the circuit under transient conditions of motor operation. Further, Johnstone teaches the use of a bleed resistor that is shorted out during start up and that, after running is achieved, is placed in series with the monitoring potential relay coil to mask over the coil's sensing of voltage fluctuations. This means that the potential relay is impeded or masked by this resistor and thus, the relay does not work to it's fullest potential.

The prior art has discovered that by connecting a large bank of capacitors from one powered winding to the third unpowered winding, sufficient phase shifting could be generated in the third winding, along with the increased voltage provided by capacitors in an alternating current system to "kick" over the third winding and cause faster starting. The problem has not been with the use of capacitors. Large capacitors such as electrolytic capacitors provide good starting power, but, due to their construction, cannot remain in the circuit for more than a few seconds less they overheat and disintegrate. Oil-filled metal film capacitors, on the other hand, provide good long term power for running but usually are insufficient in capacity (microfarads) to provide adequate starting power. The prior art has therefore just used large quantities of oil-filled metal film capacitors to start and run the three-phase converter motor. While a large enough number of these capacitors will start the motor, they contain too much capacitance to remain in the circuit during motor running. The phase angle is over-shifted in the third winding resulting in poor running characteristics, undesirable heat build-up and the voltage build-up in the third winding is too great for economical running. The prior art has sought to solve this problem using a plurality of electronic devices involving complicated circuitry, see the United States Patents cited, supra.

This invention solves the aforesaid problems and provides a quick-starting converter that allows the three-phase motor to run economically and without excessive heat build-up; it uses much less power than the prior art devices and far less complicated circuitry. The invention comprises the utilization of a bank of electrolytic capacitors to provide starting power and a switching circuit to switch them out of use during motor operation. The oil-filled metal film capacitors are only used in running the motor and thus can be sized to provide proper phase angle at running speed without producing problems during starting. The two sets of capacitors are separated to different powered windings so that they do not over shift any phase angle in any of the windings.

The overall unit of this invention is small, compact and provides three-phase alternating current to start and run a three-phase motor that may be remotely located at three-phase power such as for instance on farms or in outlying areas not generally serviced by three-phase current. The converter of this invention uses only two relays, in a novel and unique configuration, in addition to the starting capacitors and the running capacitors thus eliminating the need for expensive transformers, resistors, diodes and transistors.

SUMMARY OF THE INVENTION

The main object of this invention is a small, compact single-phase to three-phase converter that provides an economical means of producing three-phase alternating current to power a single three-phase motor under load. Other objects of this invention include a rotary phase converter having improved starting power, improved running power with balanced phases and a converter containing simplified circuitry. A further object of this invention is a device having few moving parts to provide extended life and ease in maintenance and repair. These and other objects of the invention will become more apparent upon reading the following Description of the Preferred Embodiments taken together with the drawings appended hereto. The scope of protection desired by the inventor may be gleaned from a fair reading of the claims that conclude this specification.

DESCRIPTION OF THE DRAWING

The drawing is a circuit diagram of the preferred embodiment of this invention showing the single-phase current source, spaced from one end, and a three-phase Y-wound induction motor spaced from the other end thereof.

DESCRIPTION OF THE PREFERRED EMBODIMENT

This inventive converter 1 is shown inside a housing or container generally indicated by dotted lines 3, and is designed for interposition between a typical source of single phase alternating current, such as 240 volts, shown at 5, and a typical Y-wound, 3-phase induction motor shown at 7. Motor 7 comprises first, second and third separate stator windings A, B and C respectively attached at a common center point 9 resulting in the Y-wound configuration. A rotor indicated by circle 11, is placed within the three stator windings and is the turning device by which motor 7 power various loads such as shafts, pulleys, machinery, etc.

Means 13 is provided to the two converter input conductors 15 and 17 to connect a single phase power source 5 and may take the form of various connectors such as bayonet plugs, knife switches, power jacks and the like. Means 19 is also provided to connect the three converter output conductors 21, 23 and 25 to Windings A, B and C. Means 19 may also take the form of various connectors such as bayonet plugs, knife switches, power jacks and the like and will differ form means 13 only in that a third connector is provided. Incoming conductor 15 is connected via conductor 27 to first motor winding A and incoming conductor 17 is connected directly to second motor winding B via conductor 23.

Run capacitor means 29 is connected between powered stator winding A and unpowered stator winding C by conductors 21, 31 and 25. Means 29 comprises a series of oil-filled, metal film capacitors 31 mutually connected in parallel. The total capacitance of running capacitors 31 follows the general formula of 30 microfarads per rated horse power of induction motor 7, for motors having a rating of up to 10 horse power and 25 microfarads per rated horse power for motors having a rating above 10 horse power. The function of said capacitor means 29 is to shift the phase angle of the alternating current impressed upon winding C to an angle between that of windings A and B.

A potential relay 33 is provided comprising a set of normally closed contacts 35a and 35b and a winding 37 to open them. Relay winding 37 is connected in parallel between stator windings B and C by conductors 23 and 39 and by conductors 41, 31 and 25. One side of winding 37 is connected to relay contact 35a by conductor 43. Potential relay 33 is of a type that remains closed at voltages less than 260 volts; at and above 260 volts said relay opens and remains open under voltages ranging from 260 and above to down to approximately 100 volts. Below that 100 volts, said relay closes again.

A slave relay 45 is provided comprising a set of normally open contacts 47a and 47b and a winding 49 to close them. One side of relay winding 49 is connected to slave relay contact 47b by conductors 51, 53 and 55 and to powered stator winding A by conductors 51, 57, 27 and 21. The other side of relay winding 49 is connected by conductor 59 to potential relay contact 35b. Slave relay 45 is a single-pole, single-throw, normally open 240 volt relay.

Start capacitor means 61 is connected in series between unpowered third winding C and the other open slave relay contact 47a by conductors 25 and 63 respectively. Start capacitor means 61 is shown to comprise a plurality of electrolytic-type starting capacitors 65 connected in mutual parallel. The total capacitance of starting capacitor means 61 follows the general formula of 110 microfarads per rated horse power in motor 7. There may be some variance depending upon the specific motor, however those skilled in the art would be able to perceive the need for such alteration and provide for same.

The inventive three-phase converter, described above, operates as follows: Prior to connecting means 13 to single phase power source 5, and means 19 to stator windings A, B and C of induction motor 7, normally closed contacts 35a and 35b of potential relay 33 connect winding 49 of normally open slave relay 45 in parallel between powered stator winding B and unpowered stator winding C. Starting capacitor means 61 is therefore isolated from any power source. Upon application of single-phase alternating current from source 5 through conductors 15, 53, 57, 27, 21 and 17, 23, a voltage of approximately 240 volts is developed across stator windings B and C. This voltage passes through potential relay winding 37 and through relay contacts 35a and 35b to slave relay winding 49. Slave relay winding 49 is immediately energized to close normally open contacts 47a and 47b. This closure energizes start capacitor means 61 from powered stator winding A through conductors 21, 27, 57, 53, 55 and 63. Start capacitor means 61 accordingly energizes stator winding C and shifts the phase of power brought in from powered stator winding A to cause a three-phase alternating current to exist in all three stator windings A, B and C. This three-phase alternating current provides quick starting to the rotor 11 of induction motor 7.

Commensurate with the introduction of phase-shifted alternating current to winding C, start capacitor means 61 raises the voltage in winding C beyond 240 volts. When said voltage reacher 260 volts (usually within a few seconds after energizing induction motor 7) potential relay winding 37 senses the voltage value and actuates relay 33 to open contacts 35a and 35b. Immediately, slave relay winding 49 is de-energized and contacts 47a and 47b disconnect into their normally open position. Simultaneously, start capacitor means 61 is de-energized and drops out of the electrical circuit. Run capacitor means 29, is constantly powered from source 5 through conductors 15, 53, 57, 27 and delivers phase-shifted power to unpowered stator winding C through conductors 28, and 25 for continuous running. There is thus generated a balanced three-phase alternating current in motor stator windings A, B and C.

What is claimed is:

1. A single phase to three-phase converter for starting and running a single, three-phase, load-carrying electric induction motor, said motor having first, second and third Y-wound stator windings, from a single-phase power supply, comprising:

a. means for connecting the input conductors to said converter to a source of single-phase alternating current;

b. means for connecting the output conductors from said converters to the three-phase induction motor and adapted to connect one single-phase input conductor to said first stator winding and the other single-phase input conductor to said second stator winding;

c. run capacitor means connected between said first powered stator winding and said third unpowered stator winding to develop a voltage in said third winding at a phase angle different from the phase angles in said first and second powered windings;

d. a potential-type relay comprising a set of normally closed contacts and a winding to open them, said windings connected directly between said second and third stator windings;

e. a slave relay comprising a set of normally open contacts and a winding to close them, said slave relay winding connected between said first stator winding and said potential relay winding through said set of normally closed potential relay contacts; and f. start capacitor means, connected between said third, unpowered stator winding and one of said slave relay open contacts, adapted to provide immediate capacitor-phase shifted starting power to said third stator winding when said slave relay contacts close upon said slave relay winding becoming energized by the initial voltage increase developed between said second and third stator windings when external single-phase power is applied thereto, and wherein said slave relay contacts are adapted to open and disconnect said starting capacitor means when the voltage developed between said second and said third stator windings reaches a level sufficient to energize said potential relay windings to open said relay contacts.

2. The single phase to three-phase converter of claim 1 wherein said run capacitor means comprises a plurality of oil-filled capacitors mutually connected in parallel.

3. The single phase to three-phase converter of claim 2 wherein said capacitors contain a total capacitance according to the formula of about 30 microfarads per rated horse power of the motor up to 10 rated horse power and about 25 microfarads per rated horse power of said motor above said horse power.

4. The single phase to three-phase converter of claim 1 wherein said potential-type relay remains closed between voltages, impressed across said relay winding, below about 260 volts and thereafter opens and remains open at voltages between about 100 volts and higher.

5. The single phase to three-phase converter of claim 1 wherein said slave relay is a single-pole, single-throw 240 volt relay.

6. The single phase to three-phase converter of claim 1 wherein said start capacitor means comprises a plurality of electrolytic-type capacitors mutually connected in parallel.

7. The single phase to three-phase converter of claim 6 wherein said capacitors contain a total capacitance according to the formula of about 110 microfarads of horse power of said motor.

* * * * *